(12) United States Patent
Roelofs et al.

(10) Patent No.: US 7,618,677 B2
(45) Date of Patent: Nov. 17, 2009

(54) METHOD OF POWDER COATING WELDABLE SUBSTRATES

(75) Inventors: Robert R. Roelofs, Allen Park, MI (US); Hans F. Letzring, Pleasant Ridge, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 986 days.

(21) Appl. No.: 10/767,913

(22) Filed: Jan. 29, 2004

(65) Prior Publication Data

US 2005/0003082 A1 Jan. 6, 2005

Related U.S. Application Data

(60) Provisional application No. 60/443,444, filed on Jan. 29, 2003.

(51) Int. Cl.
*B05D 1/38* (2006.01)
(52) U.S. Cl. .................... 427/202; 427/195; 427/203
(58) Field of Classification Search .................. None
See application file for complete search history.

(56) References Cited

U.S. PATENT DOCUMENTS

| | | | | |
|---|---|---|---|---|
| 5,059,446 A | * | 10/1991 | Winkle et al. | 427/482 |
| 5,368,885 A | * | 11/1994 | Fotiou | 427/195 |
| 5,635,548 A | * | 6/1997 | Kittle et al. | 523/220 |
| 5,895,622 A | * | 4/1999 | Ramani et al. | 264/440 |
| 6,440,580 B1 | * | 8/2002 | Berger et al. | 428/623 |
| 2002/0182418 A1 | | 12/2002 | Berger et al. | 428/413 |

FOREIGN PATENT DOCUMENTS

| | | |
|---|---|---|
| CS | 206112 | 6/1981 |
| DE | 130207 | 3/1978 |
| FR | 2713518 A1 | 6/1995 |
| GB | 1414484 | 5/1972 |
| JP | 78008328 | 3/1978 |
| WO | WO 03/011986 A1 | 2/2003 |
| WO | WO 03/053599 A1 | 7/2003 |

OTHER PUBLICATIONS

Powder Coating: The Complete Finisher's handbook, ed. by N.P. Liberto, pp. 47-49, 1994.*

* cited by examiner

*Primary Examiner*—Frederick J Parker
(74) *Attorney, Agent, or Firm*—Robert A. Diaz; Deborah M. Altman

(57) ABSTRACT

This invention is directed to an improved method of coating a substrate. The improvement includes applying to the substrate a rinse composition which contains one or more surface energy-modifying compounds. The invention is further directed to an improved method of producing weldable parts and the parts prepared by this method. The invention is especially useful for automotive parts using weldable pre-painted metal substrates to which are applied essentially zero VOC powder coatings.

33 Claims, No Drawings

METHOD OF POWDER COATING WELDABLE SUBSTRATES

CROSS-REFERENCE TO RELATED APPLICATION

This application claims the benefit of priority of U.S. Provisional Application Ser. No. 60/443,444 filed Jan. 29, 2003.

FIELD OF THE INVENTION

This invention relates to an improved method of producing weldable parts, in particular automotive parts using weldable pre-painted metal substrates to which are applied essentially zero VOC powder coatings. The invention also relates to parts prepared by this method.

BACKGROUND OF THE INVENTION

Light gauge continuous sheet metal is produced by rolling mill lines in various thickness and widths. In the case of steel sheet metal, it may be coated at the mill with a thin layer of zinc or zinc alloy in order to provide steel sheet with improved corrosion resistance. After production of the sheet, mill oil is applied in the case of steel sheet and the sheet metal is wound into a coil for shipment to a customer for further processing. Such sheets are used by customers for a number of industrial and automotive applications.

At the customer facility, the metal sheet is unwound and cleaned to remove any mill oil and dirt and to reduce the amount of metal oxide formed on the surface of the metal, after which the metal typically is coated with one or more layers of coating. The coatings usually include at least one primer to provide improved corrosion protection as well as adhesion of subsequent coating layers to the substrate.

One common and very effective method of applying primer to metal substrates is the electrodeposition method in which a primer with an ionic, often cationic, species on the polymer backbone, is deposited on an oppositely charged metal part. The electrocoated parts then are baked to cure the primer. Following the application of the electrocoat primer, other layers of coating such as primer-surfacer can be applied for improved adhesion and smoothness. The final layers of coating applied to the part are those generally seen by the end user. These coatings, in addition to providing protection, such as hardness, weathering protection, and the like to the part, provide a visually attractive finish.

In the production of parts for automobile and other vehicle bodies, sheet metal from the mill, usually galvanized steel, generally is stamped and formed into the desired shape. Prior to this forming step, a lubricating oil typically is applied to the substrate to facilitate the process. The forming oil then must be cleaned from the sheet. Following the cleaning step, the metal usually is pretreated with a phosphate pretreatment. The phosphated metal parts are then assembled into an automobile body with various forms of attachment such as clenching, gluing, and particularly spot welding.

Conventionally, the vehicle body then is primed with a cationic electrodeposition primer. The application of the electrodeposition primer (ED primer) at the automotive manufacturer requires immersion baths large enough to accommodate an auto-body. Such baths require large capital investment and continuous monitoring during production, and also occupy large areas of plant space. Moreover, in some instances, the ED primer may not form a film of sufficient thickness to be effective in confined or partially enclosed areas, for example, those areas where one piece of metal is bent over and clenched to another piece of metal to connect the two pieces of metal. In such a configuration, the ED primer can fail to deposit adequately in the region of the bend, thereby leaving an area of metal relatively unprotected against corrosion. Also, an adequate layer of ED primer may not form in the interior of enclosed parts such as doors.

The process of applying a weldable anticorrosive primer to the metal sheet after cleaning and prior to forming of the metal sheet into an automotive part ensures the presence of an adequate thickness of anticorrosive primer in enclosed or confined areas of vehicle assemblies. Furthermore, application of such a weldable primer to the continuous sheet of metal can be done by roll coating, i.e., a process in which the primer is applied by a roll moving in the same direction, or, more commonly, in the opposite direction, as the moving sheet of metal to be coated. After the weldable primer is applied and dried and/or cured, the continuous sheet of primed metal can be wound into a coil for storage and subsequent shipping. Roll coat application of primer to a continuous strip of metal has the advantage that it is nearly 100% efficient, that is, virtually all of the liquid primer is applied to the metal strip. When cured, the volatiles emitted during the baking process are commonly collected and burned as fuel for the curing oven, leading to low atmospheric emissions. The roll coat application and cure of the weldable primer can be done at a location separate from the vehicle manufacturing plant. Typically application of the weldable primer is conducted at a coil coating application facility, but the weldable primer may even be applied at the steel mill itself. Removal of the priming step from the vehicle manufacturing plant can eliminate the need for the large, expensive ED immersion tanks and, thus, can lead to more efficient use of space and resources in the vehicle plant.

Although use of such coating processes are well known to those practicing the coil-coating art, conventional coil coating primers generally can not be used because the steel sheet, after being cut and formed into parts in a stamping press, is usually assembled into assemblies and vehicle bodies by spot welding. Conventional coil coating primers do not allow sufficient electric current to pass during the spot welding process to cause a weld to form in the metal. If conventional coil coatings are applied very low dry film thickness enough current may pass to form a weld, but at such low thickness corrosion protection is inadequate. The weldable primer of the current invention avoids such limitations by inclusion of electrically conductive pigments as well as anticorrosive pigments to give a weldable formable primer with good corrosion protection. Because the primer is electrically conductive, additional corrosion protection can be realized, if desired, by coating the parts formed from the pre-painted metal with ED primer after they are assembled.

After assembly of the parts formed from the metal sheet coated with weldable primer, the parts may optionally be given an additional phosphate pretreatment, rinsed with water, and dried. The parts can then be coated with any of a variety of top coat compositions known in the art. In co-owned, co-pending U.S. patent application Ser. No.10/025,406, filed Dec. 19, 2001, such assembled parts subsequently are coated with a colored powder coating and, optionally, a clear powder top coating. Powder basecoats and clearcoats are desirable because they are known to provide superior appearance and chip resistance versus liquid coatings; essentially zero VOC versus liquid coatings; and 98 to 99% utilization in most facilities versus 70 to 80% maximum for liquids.

The colored powder basecoat comprises metallic or non-metallic flake pigments. The assembled parts to which the powder basecoat is applied are baked for a period of time sufficient to melt and coalesce the powder coating. If a clear coat is to be subsequently applied to the powder basecoat, the parts are baked for a time and at a temperature sufficient to melt and coalesce the powder basecoat, but insufficient to cure the powder basecoat. The powder basecoat may be used without further coatings, but improved hardness, weathering and UV resistance, and visual appeal will be realized with application of a powder clearcoat. These powder clearcoats provide similar VOC and utilization advantages as those gained with powder basecoats with appearance and durability comparable to liquid clear coats. U.S. Pat. No. 5,407,707 describes the preparation of powder clear coats with excellent physical and chemical properties prepared from epoxy functional copolymers and polycarboxylic acid curing agents.

Upon application of the clearcoat, particularly a powder clearcoat, the coated parts are heated to a temperature and for a time sufficient to co-cure the powder basecoat and clearcoat.

The advantages of the invention are the ability to produce panels and parts, particularly for automotive applications, with striking visual effects, good hardness, and weather and UV resistance by a method that does not require the use of large expensive electrodeposition baths. However, one of the deficiencies of the above-described coating method is that coating defects can form in the cured powder coating due to the escape of air and other gases which are entrapped in the substrate surface and/or in the coating itself. It is believed that these defects arise as the entrapped air and gasses migrate through the basecoat and exit through the clearcoat surface as it is curing.

Thus, it would be desirable to provide a method of powder coating weldable substrates, particularly metallic substrates, which prevents the formation of such defects upon thermal curing of the powder coating system.

SUMMARY OF THE INVENTION

In one embodiment, the present invention is directed to a method of coating a substrate comprising the steps of (a) optionally, applying a pretreatment composition to at least a portion of the substrate; (b) applying a rinse composition to the substrate, said rinse composition comprising one or more surface energy-modifying compounds; (c) applying a powder coating composition to the substrate of step (b); and (d) heating the substrate to a temperature and for a time sufficient to melt and coalesce the powder coating composition to form a substantially continuous powder coating on the substrate.

In another embodiment, the present invention is directed to a method of coating a metallic substrate comprising the steps of (a) optionally, applying a pretreatment composition to at least a portion of the substrate; (b) applying a rinse composition to the substrate, said rinse composition comprising one or more surface energy-modifying compounds; (c) applying a powder coating composition to the substrate of step (b); and (d) heating the substrate to a temperature and for a time sufficient to melt and coalesce the powder coating composition to form a substantially continuous powder coating on the substrate.

The present invention also is directed to a method of coating a substrate comprising the steps of (a) optionally, applying a pretreatment composition to the substrate; (b) optionally, applying a conductive, weldable coating composition to the substrate; (c) optionally, coalescing the conductive, weldable coating composition to form a substantially continuous conductive coating; (d) applying a rinse composition to the substrate, said rinse composition comprising one or more surface energy modifying compounds; (e) applying a powder coating composition to the substrate of step (d); (f) heating the powder coating composition to a temperature and for a period of time sufficient to melt and level the powder coating composition to form a substantially continuous powder coating, but not sufficient to cause the powder coating composition to crosslink; (g) optionally, applying a crosslinkable clear coating composition over at least a portion of the powder coating; and (h) heating the substrate to a temperature and for a period of time sufficient to coalesce and crosslink the coating composition applied in steps (e) and (g). Coated substrates also are provided.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, the term "cure" as used in connection with a composition, e.g., "composition when cured," and "thermoset" as used in connection with a composition, e.g. "thermoset composition" shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

As used herein, the terms "typically", e.g., "The temperature of the treating solution at application is typically about 10° C. to about 85° C."; "generally", e.g., "The width of the continuous metal sheet generally ranges from about 30.5 to about 183 centimeters"; and "commonly", e.g., "more commonly, the substrates coated by this method will be metallic" as used in the detailed description of the invention is intended to describe methods frequently used, but is not intended to limit the application of the invention.

As previously mentioned, in one embodiment, the present invention is directed to a method of coating a substrate comprising the steps of (a) optionally, applying a pretreatment composition to at least a portion of the substrate; (b) applying a rinse composition to the substrate, said rinse composition comprising one or more surface energy-modifying compounds; (c) applying a powder coating composition to the substrate of step (b); and (d) heating the substrate to a temperature and for a time sufficient to melt and coalesce the powder coating composition to form a substantially continuous powder coating on the substrate.

In another embodiment, the present invention is directed to a method of coating a metallic substrate comprising the steps of (a) optionally, applying a pretreatment composition to at least a portion of the substrate; (b) applying a rinse composition to the substrate, said rinse composition comprising one or more surface energy-modifying compounds; (c) applying a powder coating composition to the substrate of step (b); and (d) heating the substrate to a temperature and for a time sufficient to melt and coalesce the powder coating composition to form a substantially continuous powder coating on the substrate.

Also, the present invention relates to a method of coating a substrate comprising the steps of (a) optionally, applying a pretreatment composition to the substrate; (b) optionally, applying a conductive, weldable coating composition to the substrate; (c) optionally, coalescing the conductive, weldable coating composition to form a substantially continuous conductive coating; (d) applying a rinse composition to the substrate, said rinse composition comprising one or more surface energy modifying compounds; (e) applying a powder coating composition to the substrate of step (d); (f) heating the powder coating composition to a temperature and for a period of time sufficient to melt and level the powder coating composition to form a substantially continuous powder coating, but not sufficient to cause the powder coating composition to crosslink; (g) optionally, applying a crosslinkable clear coating composition over at least a portion of the powder coating; and (h) heating the substrate to a temperature and for a period of time sufficient to coalesce and crosslink the coating composition applied in steps (e) and (g).

Substrates useful in the method of the present invention may be non-metallic, for example, thermoplastic or elastomeric substrates, or metallic substrates, or combinations of the two. More commonly, the substrates coated by this method comprise metallic substrates including ferrous metals, non-ferrous metals, and combinations thereof. Suitable ferrous metals include iron, steel, and alloys thereof. Non-limiting examples of useful steel materials include cold rolled steel, zinc coated steels such as hot dip galvanized and electrogalvanized steel, stainless steel, pickled steel, zinc-iron alloy such as GALVANEAL, zinc-aluminum alloys coated over steel such as GALVALUME, AND GALFAN, and combinations thereof. It is possible for different portions of the same substrate to be different forms of ferrous metal, for example, for the zinc coating to be applied to only certain portions or one side of the steel substrate.

Useful non-ferrous metals include aluminum, zinc, magnesium, and alloys thereof. Combinations or composites of ferrous and non-ferrous metals can also be used. Preferred metallic substrates are anti-corrosive steels such as the zinc coated steels and the zinc-iron alloy and the zinc-aluminum alloys mentioned above. In an embodiment of the present invention, the substrate comprises a zinc iron alloy.

Although substrates of any desired shape can be used, the substrate is preferably in the form of a sheet, and more preferably in the form of a continuous sheet wound about a spool in the form of a coil. The thickness of the continuous sheet preferably ranges from about 0.254 to about 3.18 millimeters (mm) (about 10 to about 125 mils), and more preferably about 0.3 mm although the thickness can be greater or less, as desired. The width of the continuous metal sheet generally ranges from about 30.5 to about 183 centimeters (about 12 to 72 inches), although the width can vary depending on metal manufacturer and intended use.

Before depositing the coatings of the present invention upon the surface of the metal substrate, it is preferred to remove dirt, oil, or foreign matter from the metal surface by thoroughly cleaning and degreasing the surface. The surface of the metal substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. Non-limiting examples of suitable alkaline cleaning agents include CHEMKLEEN® 163 and CHEMKLEEN® 177 phosphate cleaners that are commercially available from PPG Industries, Inc. of Pittsburgh, Pa.

Following the cleaning step, the metal substrate is usually rinsed with water, typically deionized water, in order to remove any residue. The metal substrate optionally can be dried using an air knife, by flashing the water off by brief exposure to a high temperature, or by passing the metal between squeegee rolls.

Following the cleaning and optional drying steps, the metal substrate may be pretreated with a thin layer of pretreatment if desired. The advantages of pretreatment include protection of the metallic substrate from corrosion and improvement of adhesion of subsequent coating layers to the substrate. Suitable pretreatments can include chrome containing, but typically are chrome-free. The choice of pretreatment is generally determined by the substrate and environmental considerations. Appropriate pretreatments are well known to those skilled in the art. An example of a suitable chrome pretreatment is GRANODINE® 1415A available from Henkel Surface Technologies, NA. An example of a chrome-free pretreatment is NUPAL® 456BZ, a phosphated epoxy ester, available from PPG Industries, Inc. Some weldable compositions, in particular those comprising phosphatized epoxy resinous binder systems, perform well even in the absence of pretreatment.

In an embodiment of the present invention, the metal substrate is pretreated with a phosphated epoxy ester.

The pretreatment solution can be applied to the surface of the metal substrate by any conventional application technique, such as spraying, immersion or roll coating in a batch or continuous process. The temperature of the treating solution at application is typically 10° C. to 85° C., and preferably 15° C. to 40° C. The pH of the preferred treating solution at application generally ranges from 2.0 to 9.0, and is preferably 3.0 to 5.0.

The film coverage of the residue of the pretreatment coating generally ranges from 0.1 to 1000 milligrams per square meter (mg/m2), and usually 1 to 400 mg/m2.

Hereafter, the term "substrate" shall refer to the cleaned, optionally pretreated, substrate.

Following the optional pretreatment step, a conductive, weldable coating can be, but is not necessarily, applied to the cleaned substrate. The conductive, weldable coating is formed from a weldable composition comprising one or more electroconductive pigments which provide electroconductivity to the weldable coating, and one or more binders, which adhere the electroconductive pigment to the substrate. Non-limiting examples of suitable electroconductive pigments include zinc, iron phosphide, aluminum, iron, graphite, nickel, tungsten and mixtures thereof. The zinc, iron phosphide, and mixtures thereof are preferred. Preferred zinc particles are commercially available from Stolberger ZINCOLI as ZINCOLI S 620 or from US Zinc as Superfine 7 zinc dust. The iron phosphide is available as FERROPHOS Microfine grade 2132 from Glenn Springs Holdings of Lexington, Ky. The average particle size (equivalent spherical diameter) of the electroconductive pigment particles generally is less than 10 micrometers, and usually ranges from 1 to 5 micrometers, and typically 3 micrometers.

Since the metal substrates may need to be subsequently welded, the weldable coating usually comprises a substantial amount of electroconductive pigment, generally greater than 10 volume percent and typically 30 to 60 volume percent on a basis of total volume of electroconductive pigment and binder.

The binder is present to secure the electroconductive pigment and other pigments in the composition to the substrate. Preferably, the binder can form a generally continuous film when applied to the surface of the substrate. Generally, the amount of binder can range from 5 to 50 weight percent of the coating composition on a total solids basis, usually 10 to 30 weight percent and typically 10 to 20 weight percent.

The binder can comprise oligomeric binders, polymeric binders and mixtures thereof. The binder most often comprises a resinous polymeric binder material selected from thermosetting binders, thermoplastic binders or mixtures thereof. Non-limiting examples of suitable thermosetting materials include polyesters, epoxy-containing materials, phenolics, polyurethanes, and mixtures thereof, in combination with crosslinkers such as aminoplasts or isocyanates, which are discussed below. Non-limiting examples of suitable thermoplastic binders include: high molecular weight epoxy resins; defunctionalized epoxy resins; vinyl polymers; polyesters; polyolefins; polyamides; polyurethanes; acrylic polymers; and mixtures thereof.

Preferred binder materials include polyglycidyl ethers of polyhydric phenols, such as those discussed above, having a weight average molecular weight of at least 2000 and usually ranging from 5000 to 100,000. These materials can be epoxy functional or defunctionalized by reacting the epoxy groups with phenolic materials. Such binders can have epoxy equivalent weights of 2000 to one million. Non-limiting examples of useful epoxy resins are commercially available from Shell Chemical Company as EPON® epoxy resins. Preferred EPON® epoxy resins include EPON® 1009, which has an epoxy equivalent weight of about 2300-3800. Useful epoxy defunctionalized resins include EPONOL resin 55-BK-30 which is commercially available from Shell. Other preferred binders are the reaction product of epoxy resins as described above with a compound containing phosphorous acid groups.

Suitable crosslinkers or curing agents are described in U.S. Pat. No. 4,346,143 at column 5, lines 45-62 and include blocked or unblocked di- or polyisocyanates such as DES-MODUR® BL 1265 toluene diisocyanate blocked with caprolactam, which is commercially available from Bayer, and aminoplasts such as etherified derivatives of urea-melamine- and benzoguanamine-formaldehyde condensates which are commercially available from Cytec Industries under the trademark CYMEL® and from Solutia under the trademark RESIMENE®.

The weldable coating composition can further comprise one or more diluents for adjusting the viscosity of the composition so that it can be applied to the metal substrate by conventional coating techniques. The diluent should be selected so as not to detrimentally affect the adhesion of the weldable coating to the pretreatment coating upon the metal substrate. Suitable diluents include ketones such as cyclohexanone (preferred), acetone, methyl ethyl ketone, methyl isobutyl ketone and isophorone; esters and ethers such as 2-ethoxyethyl acetate, propylene glycol monomethyl ethers such as DOWANOL PM, dipropylene glycol monomethyl ethers such as DOWANOL DPM or propylene glycol methyl ether acetates such as PM ACETATE which is commercially available from Dow Chemical; and aromatic solvents such as toluene, xylene, aromatic solvent blends derived from petroleum such as SOLVESSO® 100. The amount of diluent can vary depending upon the method of coating, the binder components and the pigment-to-binder ratio, but generally ranges from 10 to 50 weight percent on a basis of total weight of the weldable coating.

The coating can further comprise optional ingredients such as phosphorus-containing materials, including metal phosphates or the organophosphates; inorganic lubricants such as GLEITMO 1000S molybdenum disulfide particles which are commercially available from Fuchs of Germany; coloring pigments such as iron oxides; flow control agents; thixotropic agents such as silica, montmorillonite clay and hydrogenated castor oil; anti-settling agents such as aluminum stearate and polyethylene powder; dehydrating agents which inhibit gas formation such as silica, lime or sodium aluminum silicate; and wetting agents including salts of sulfated castor oil derivatives such as RILANIT R4.

Other pigments such as carbon black, magnesium silicate (talc), zinc oxide and corrosion inhibiting pigments including calcium modified silica, zinc phosphate and molybdates such as calcium molybdate, zinc molybdate, barium molybdate and strontium molybdate and mixtures thereof can be included in the coating composition. Generally, these optional ingredients comprise less than 20 weight percent of the electrocoating composition on a total solids basis, and usually 5 to 15 weight percent. In an embodiment of the present invention, the weldable coating is essentially free of chromium-containing materials, i.e., comprises less than 2 weight percent of chromium-containing materials and, typically, is free of chromium-containing materials.

In one embodiment of the present invention, the weldable coating compositions contain EPON® 1009 epoxy-functional resin or the reaction product of Epon® 1004 with phosphoric or superphosphoric acid, zinc dust, salt of a sulfated castor oil derivative, silica, molybdenum disulfide, red iron oxide, the blocked isocyanate formed by the reaction of polymeric MDI with the reaction product of bisphenol A and polyethylene oxide, melamine resin, dipropylene glycol methyl ether, propylene glycol methyl ether acetate and cyclohexanone.

The weldable coating compositions can be applied to the surface of the substrate by any conventional method well known to those skilled in the art, such as dip coating, direct roll coating, reverse roll coating, curtain coating, air and airless spraying, electrostatic spraying, pressure spraying, brushing such as rotary brush coating or a combination of any of the techniques discussed above.

After application, the conductive, weldable coating compositions are preferably dried and/or cured to set the coating composition and form a substantially continuous coating upon the substrate. Depending upon the composition components, the weldable coating can be formed at ambient temperature or at an elevated temperature ranging up to 300° C. peak metal temperature. Many of the binders such as those prepared from epoxy-containing materials require curing at an elevated temperature for a period of time sufficient to vaporize any diluents in the coating and to set the binder. In general, baking temperatures will be dependent upon film thickness and the components of the binder. For preferred binders prepared from epoxy-containing materials, peak metal temperatures of ranging from 150° C. to 300° C. are typical. For binders prepared from phosphated epoxy-containing materials, peak metal temperatures ranging from 140° C. to 190° C. are typical. The period of baking in conventional conveyor ovens is typically from 20 seconds to 60 seconds, preferably from 24 seconds to 30 seconds. The period of baking is usually determined by the time required to reach desired peak metal temperature in a given oven. It will be recognized by those skilled in the art that alternate means of heating the substrate such as infrared or induction heating will require much shorter times to reach peak metal temperature, often less than 10 seconds. After the baking the coated substrate can be cooled with water, followed by drying, for example, with an air knife.

The thickness of the dried, conductive, weldable coating can vary depending upon the end-use. Generally, to achieve sufficient corrosion resistance for coil metal for automotive use, the applied coating should have a dry film thickness of at least 1 micrometer (0.04 mils), usually 1 to 20 micrometers and typically 3 to 8 micrometers. For other substrates and other applications, thinner or thicker coatings can be used. Preferred dry film thickness for zinc pigmented coatings in this invention is between 3 micrometers and 5 micrometers, preferred dry film thickness for the iron phosphide-pigmented weldable coatings in this invention is between 5 micrometers and 8 micrometers.

After the conductive, weldable coating has been dried and/or cured, the metal substrate may be optionally lubricated, and the metal may be wound into a coil for storage or for transport to another location for further operations.

The steps described above may be conducted at a mill, or more commonly, the metal is wound into a coil at the mill and shipped to a separate location, such as a coil coater, for the coating operation where the above-described steps are carried out. After coating the sheet is rewound into a coil and shipped to another location, such as an automotive assembly plant where the metal is unwound, cleaned, optionally lubricated, cut into appropriate sized sheets, formed into discrete shapes, spot welded into a unit assembly, such as an automobile body.

In an embodiment of the present invention, the unit assembly is then optionally cleaned and pretreated, typically with a phosphate type pretreatment and, optionally, primed with electrodeposited primer. Suitable phosphate type pretreatments include those commonly available from PPG Industries, Inc. under the general tradename CHEMFOS®.

After application and drying/curing of the weldable coating, if employed, a rinse composition is applied to the substrate surface (or to the surface of the coating or pretreatment applied immediately before). As previously mentioned, the rinse composition comprises one or more surface modifying compounds. It should be understood that in some embodiments of the present invention where no weldable coating has been applied to the substrate, the rinse composition can be applied directly to the surface of the substrate. Alternatively, the rinse composition can be applied to the substrate surface immediately subsequent to the phosphate type pretreatment. For purposes of the present invention, the rinse composition can be applied at any stage provided that application of the rinse composition and any subsequent drying steps is immediately followed by application of the powder coating composition (described in detail below).

As mentioned above, the rinse composition comprises one or more surface energy-modifying compounds. Such surface energy-modifying compounds can include any compound or combination of compounds capable of providing a substrate surface energy lower than the surface tension of the powder coat composition (which is immediately subsequently applied) as the powder base coat is heated to melt and coalesce, but not crosslink, the powder coating. Without intending to be bound by any theory, it is believed that such surface energy modification facilitates the egress of air and other gases that can be entrapped in the substrate surface or within the powder coating itself as the powder coating melts and coalesces. In this way, defects in the coating which can be formed during the curing process, as discussed above, can be reduced or eliminated altogether.

The surface energy-modifying compound can include, for example, any of a variety of surfactants well known in the art. Suitable surfactants can include nonionic surfactants, amphoteric surfactants, cationic surfactants and anionic surfactants. In one embodiment of the present invention, the surface energy-modifying compound is selected from nonionic surfactants, amphoteric surfactants, and mixtures thereof.

Exemplary, non-limiting classes of useful nonionic surfactants include the polyethylene, polypropylene, and polybutylene oxide condensates of alkyl phenols. In general, the polyethylene oxide condensates are a preferred class of nonionic surfactants. These compounds include the condensation products of alkyl phenols having an alkyl group containing from about 6 to about 12 carbon atoms in either a straight chain or branched chain configuration with the alkaline oxide. These compounds are commonly referred to as alkyl phenol alkoxylates, (e.g., alkyl phenol ethoxylates). A specific example of such alkyl phenol ethoxylates is ANTAROX CO 630, a nonyl phenol 9-10 mole ethoxylate commercially available from Rhodia.

Also suitable are the condensation products of aliphatic alcohols having from 1 to 25 moles of ethylene oxide. The alkyl chain of the aliphatic alcohol can either be straight or branches, primary or secondary, and generally contains from about 8 to about 22 carbon atoms. Particularly suitable are the condensation products of alcohols having an alkyl group containing from 10 to 20 carbon atoms with from 2 to 18 moles of ethylene oxide per mole of alcohol. A specific example of such aliphatic alcohol condensates is TOMADOL 1-5, a C11 linear alcohol 5 mole ethoxylate commercially available from Tomah Products, Inc.

Also, the condensation products of ethylene oxide with a hydrophobic base formed by the condensation of propylene oxide with propylene glycol can be used. Examples of compounds of this type include certain of the commercially available PLURONIC™ surfactants, marketed by BASF.

Condensation products of ethylene oxide with the product resulting from the reaction of propylene oxide and ethylenediamine may appropriately be used as well. Examples of this type of nonionic surfactant include certain of the commercially available TETRONIC™ compounds, marketed by BASF.

Suitable nonionic surfactants can include ethoxylated amines such as VARONIC K205, a cocoamine 5 mole ethoxylate commercially available from Witco Alkylpolysaccharides such as those disclosed in U.S. Pat. No. 4,565,647, having a hydrophobic group containing from 6 to 30 carbon atoms, preferably from 10 to 16 carbon atoms and a polysaccharide, e.g., a polyglycoside, hydrophilic group containing from 1.3 to 10, preferably from 1.3 to 3, most preferably from 1.3 to 2.7 saccharide units, can be used. Any reducing saccharide containing 5 or 6 carbon atoms can be used, e.g., glucose, galactose and galactosyl moieties can be substituted for the glucosyl moieties (optionally, the hydrophobic group is attached at the 2-,3-,4-, etc. positions, thus giving a glucose or galactose as opposed to a glucoside or galactoside). The intersaccharide bonds can be, e.g., between the one position of the additional saccharide units and the 2-,3-,4-, and/or 6-positions on the preceding saccharide units. The amphoteric surfactants useful in the rinse compositions of the present invention include, but are not limited to, betaines, sultaines, hydroxysultaines, alkyl amphodiacetates, alkyl amphodipropionates, and imidazolines, mixtures thereof and/or salts thereof. A specific example of such amphoteric surfactants is MIRATAINE ASC, an alkylether hydroxypropyl sultaine available from Rhodia. It is recognized that other fatty acid condensates such as those formed with amino acids, proteins, and the like are suitable as well. Specific examples include cocamphodipropionate, for example, MIRANOL C2M-SF Conc. (a disodium cocamphodipropionate in its salt-free form) available from Rhone-Poulenc; and CROSULTAINE C-50 (a cocamidopropyl hydroxysultaine available from Croda). Other amphoteric surfactants useful in the rinse compositions of the present invention can include disodium wheatgermimido PEG-2 sulfosuccinate, available under the trade name MACKANATE WGD from McIntyre Group Ltd. and disodium soyamphodiacetate, available under the trade name MACKAM 2S from McIntyre Group Ltd.

Examples of suitable anionic surfactants include alkyl sulfate surfactants alkyl sulfates have the general formula ROSO3 M wherein R preferably is a C10 to C24 hydrocarbyl, preferably an alkyl or hydroxyalkyl having a C10 to C20 alkyl component, more preferably a C12 to C18 alkyl or hydroxyalkyl, and M is H or a cation, e.g., an alkali metal cation (e.g., sodium, potassium, lithium), substituted or unsubstituted ammonium cations such as methyl-, dimethyl-,and trimethyl-ammonium and quaternary ammonium cations, e.g., tetramethylammonium and dimethyl piperdinium, and cations derived from alkanolamines such as ethanolamine, diethanolamine, triethanolamine, and mixtures thereof, and the like. Alkyl alkoxylated sulfate surfactants are another category of useful anionic surfactants. These surfactants are water soluble salts or acids typically of the formula RO(A)m SO3M, wherein R is an unsubstituted C10-C24 alkyl or hydroxyalkyl group having a C10-C24 alkyl component, preferably a C12-C20 alkyl or hydroxyalkyl, more preferably C12-C18 alkyl or hydroxyalkyl. A is an ethoxy or propoxy unit, m is greater than zero, typically between 0.5 and 6, more preferably 0. 5 and 3, and M is H or a cation, which can before example, a metal cation (e.g., sodium, potassium, lithium, calcium, magnesium, etc.), ammonium or substituted-ammonium cation.

Alkyl ethoxylated sulfates, as well as alkyl propoxylated sulfates, also are contemplated herein as suitable anionic surfactants. Specific examples of substituted ammonium cations include methyl-, dimethyl-, trimethyl-ammonium and quaternary ammonium cations, such as tetramethyl-ammonium, dimethyl piperydinium and cations derived from alkanolamines, e.g., monoethanolamine, diethanolamine, and triethanolamine, and mixtures thereof. Exemplary surfactants are C12 to C18 alkyl polyethoxylate (1.0) sulfate, C12-C18 alkyl polyethoxylate (2.25) sulfate, C12-C18 alkyl polyethoxylate (3.0) sulfate, and C12-C18 alkyl polyethoxylate (4.0) sulfate, wherein M is selected from sodium and potassium. A specific particularly suitable anionic surfactant is DUPONOL G, an amine long chain alcohol sulfate available from Witco.

Other types of anionic surfactants can also be included in the rinse compositions hereof. These can include salts (including, for example, sodium, potassium, ammonium, and substituted ammonium salts such as mono-, di- and triethanolamine salts) of soap, C9-C20 linear alkylbenzenesulphonates, C8-C22 primary or secondary alkanesulphonates, C8-C24 olefinsulphonates, sulphonated polycarboxylic acids, alkyl glycerol sulfonates, fatty acyl glycerol sulfonates, fatty oleyl glycerol sulfates, alkyl phenol ethylene oxide ether sulfates, paraffin sulfonates, alkyl phosphates, isothionates such as the acyl isothionates, N-acyl taurates, fatty acid amides of methyl tauride, alkyl succinamates and sulfosuccinates, monoesters of sulfosuccinate (especially saturated and unsaturated C12-C18 monoester) diesters of sulfosuccinate (especially saturated and unsaturated C6-C14 diesters), N-acyl sarcosinates, sulfates of alkylpolysaccharides such as the sulfates of alkylpolyglucoside, branched primary alkyl sulfates, alkyl polyethoxy carboxylates such as those of the formula RO(CH2 CH2 O)kCH2 COO-M+ wherein R is a C8-C22 alkyl, k is an integer from 0 to 10, and M is a soluble salt-forming cation, and fatty acids esterified with isethionic acid and neutralized with sodium hydroxide. Further examples can be found in Surface Active Agents and Detergents (Vol. I and II by Schwartz, Perry and Berch).

Cationic surfactants also are suitable for use in the rinse compositions of the present invention. Suitable cationic surfactants can include, for example, cationic/quaternary surfactants/Trimethyl C8C10 quaternary ammonium chloride; cationic/quaternary surfactants/Trimethyl dodecyl ammonium chloride; cationic/quaternary surfactants/Dicoco dimethyl ammonium chloride; cationic/quaternary surfactants/N-alkyl trimethyl ammonium chloride; cationic/quaternary surfactants/Oleamidepropyl PG dimonium chloride; and cationic/quaternary surfactants/Methyl bis(2-hydroxyethyl cocoalkyl quaternary ammonium chloride. A particularly suitable cationic surfactant is LAROSTAT 264, a modified soyadimethylethyl ammonium ethosulfate available from BASF.

Additionally, other compounds have been found to be effective as surface energy-modifying compounds in the rinse compositions of the present invention. Such compounds include, but are not limited to, amines, for example, primary alkanolamine such as 2-amino-2-methyl-1-propanol, and monoethanolamine, i.e., 2-amino ethanol; and certain polymers, for example, acrylic acid polymers such as GOOD-RITE K-700 available from B.F.Goodrich and ACRYSOL LMW available from Rohm and Haas.

Mixtures of any of the above-mentioned surface energy-modifying compounds can be used advantageously.

The rinse composition typically comprises a solution of one or more of the surface energy-modifying compounds in aqueous medium, primarily water. A minor amount of organic solvent can be included provided that the solvent is not present in an amount or is of the type, which will negatively impact the desired surface energy modification. The rinse composition also can comprise additive ingredients, for example, defoamers and pH modifiers.

The rinse compositions useful in the methods of the present invention can comprise a concentration of the surface energy-modifying compound(s) ranging from 150 to 50,000 parts per million, usually from 250 to 25,000 parts per million, and typically from 500 to 15,000 parts per million. The rinse composition can be applied to the substrate by any application technique known in the art. Typically, the rinse composition is applied by immersion or spray application techniques. Once applied, the rinse composition is dried, such as by air drying or exposure to elevated temperatures, to remove water and/or any organic solvents present in the composition. Thus a film of the surface energy-modifying compound(s) is left on the substrate surface. It will be understood by those skilled in the art that the resultant dried weight of the applied rinse composition, that is, the surface energy-modifying compound, is dependent upon the concentration of these compound(s) present in the rinse composition.

The unit assembly typically is then coated with a decorative color coating composition and, optionally, further coated with a clear coat. The color coating composition is in the form of a solid particulate composition commonly referred to as a powder coating. The composition of the powder coating comprises a polymeric film-forming binder and, optionally a coloring pigment, including a flake pigment such as aluminum flake and/or metal oxide coated micas.

In an embodiment of the present invention, the polymeric, film-forming binder of the base powder coating is of the thermoset type wherein the binder comprises: (a) one or more polymers having reactive functional groups and; (b) one or more curing agents selected to react with the functional groups of (a).

Polymers Containing Functional Groups

The powder base coat compositions of the present invention comprise polymers containing functional groups such as hydroxyl, carboxylic acid, epoxy, carbamate, amide and carboxylate functional groups.

The use in powder coatings of acrylic, polyester, polyether and polyurethane oligomers and polymers having hydroxyl functionality is well known in the art. Monomers for the synthesis of such oligomers and polymers are chosen such that the resulting oligomers and polymers have a Tg greater than 40° C. Examples of such oligomers and polymers having hydroxyl functional groups suitable for use in the powder coating compositions of the present invention are those described in U.S. Pat. No. 5,646,228 at column 5, line 1 to column 8, line 7, incorporated by reference herein.

The use in powder coatings of acrylic polymers having carboxylic acid functionality is well known in the art. Monomers for the synthesis of the acrylic polymers having carboxylic acid functionality suitable for use in the powder coating compositions of the present invention are chosen such that the resulting acrylic polymer has a Tg greater than 40° C. Examples of carboxylic acid group containing acrylic polymers are those described in U.S. Pat. No. 5,214,101 at col. 2, line 59 to col. 3, line 23, hereby incorporated by reference.

The use in powder coatings of polyester polymers having carboxylic acid functionality is well known in the art. Monomers for the synthesis of the polyester polymers having carboxylic acid functionality suitable for use in the powder coating compositions of the present invention are chosen such that the resulting polyester polymer has a Tg greater than 40° C. Examples of carboxylic acid group containing polyester polymers are those described in U.S. Pat. No. 4,801,680 at col. 5, lines 38 to 65, hereby incorporated by reference.

Besides carboxylic acid group-containing acrylic polymers, the powder coating compositions of the present invention can, and typically do, contain a second carboxylic acid group-containing material selected from the class of C4 to C20 aliphatic dicarboxylic acids, polymeric polyanhydrides, low molecular weight polyesters having an acid equivalent weight from about 150 to about 750 and mixtures thereof. This material is crystalline and is preferably a low molecular weight crystalline carboxylic acid group-containing polyester.

Also useful in powder coating compositions are acrylic, polyester and polyurethane polymers containing carbamate functional groups and epoxy functional groups, such as those well known in the art. Examples of such polymers having carbamate functionality suitable for use in the powder coating compositions of the invention are described in international application WO 94/10213. Examples of polymers having epoxy functionality suitable for use in powder coating compositions are described in U.S. Pat. No. 5,407,707. Monomers for the synthesis of such polymers for use in the powder coating compositions are chosen such that the resulting polymer has a high Tg, that is, a Tg greater than 40° C.

For the powder color coat, the preferred polymer containing functional groups is a carboxylic acid group-containing polymer, preferably a polyester polymer. For the powder clear coat, the preferred polymer is an epoxy functional polymer, preferably an epoxy group-containing acrylic polymer.

Curing Agents

Blocked isocyanates, as curing agents for OH and primary and/or secondary amino group containing materials, are well known in the art. Examples of blocked isocyanates suitable for use as curing agents in the powder coating compositions of the present invention are those described in U.S. Pat. No. 4,988,793, col. 3, lines 1 to 36, hereby incorporated by reference.

Polyepoxides as curing agents for COOH functional group containing materials are well known in the art. Examples of polyepoxides suitable for use as curing agents in the powder coating compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the powder coating compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides, and are well known in the art. Polyols for use in the powder coating compositions of the present invention are selected such that the resultant material has a high glass transition temperature, i.e., greater than 50° C.

Beta-hydroxyalkylamide materials as crosslinkers for carboxylic acid-functional polymers (a) are disclosed in U.S. Pat. No. 4,801,680. The hydroxyl functionality of the beta-hydroxyalkylamide should be on an average basis at least two, preferably greater than two, and more preferably from greater than two up to about four in order to obtain optimum curing response.

The beta-hydroxyalkylamide materials can be depicted structurally as follows:

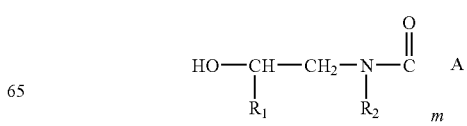

-continued

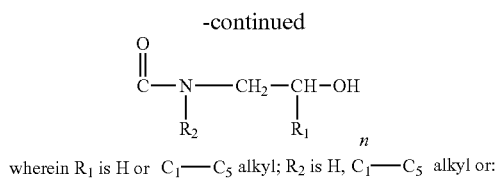

wherein R₁ is H or $C_1$—$C_5$ alkyl; R₂ is H, $C_1$—$C_5$ alkyl or:

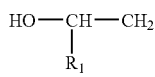

wherein R1 is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical —(CH2)x- where x is from 2 to 12, preferably from 4 to 10.

The beta-hydroxyalkylamide can be prepared by reacting a lower alkyl ester or mixture of esters of carboxylic acids with a beta-hydroxyalkylamine at a temperature ranging from ambient temperature up to about 200° C. depending on the choice of reactants and the presence or absence of a catalyst. Suitable catalysts, include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are undesirable because of poor cure.

Anhydrides as curing agents for epoxy functional group containing materials are well known in the art. Examples of such curing agents include trimellitic anhydride, benzophenone tetracarboxylic dianhydride, pyromellitic dianhydride, tetrahydrophthalic anhydride, and the like as described in U.S. Pat. No. 5,472,649 at col. 4, lines 49 to 52.

Aminoplasts as curing agents for OH, COOH and carbamate functional group containing materials are well known in the art. Examples of such curing agents suitable for use in the present invention are aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

In one embodiment, the curing agent for the powder base coat comprises hydroxyalkylamides that are used in conjunction with the carboxylic acid functional polymers. Such a binder system is described in U.S. Pat. No. 4,801,680

The typical curing agent for the powder clear coat comprising an epoxy-functional polymer is a polycarboxylic. Such a binder system is described in U.S. Pat. No. 5,407,707.

Examples of suitable flake pigments include aluminum flake pigments such as PCA9155 manufactured by Eckart. Other metal flake compositions may be used such as bronze flake, stainless steel flake, and the like; silver flake, and other precious metal flakes Preferred flake pigments range from 1.0 to 50.0 micron in size. In addition to the flake pigments described, other metallized polymeric particles may be used. Examples include aluminized Mylar and aluminized polyester fibers.

In an embodiment of the present invention, the flake pigments comprise metal oxide coated mica particles. The metal oxides used as coatings on the mica particles can comprise titanium dioxide, ferric oxide, chromium hydroxide, and the like and combinations thereof. Suitable mica flake pigments are available commercially as Afflair pigments from EM Chemicals and the Mearl Corporation's pearlescent pigments.

The flake pigment can be incorporated into the powder coating at a level of 0.1% to 20.0% based on the total weight of the powder coating. More preferred amounts of the flake pigment is between 1.0% and 10.0% based on total weight of the coating composition.

In order for attractive visual effects caused by the orientation of the flake pigment in the resultant coating to be realized, the flake pigment particles are incorporated into the powder coating by either dry blending rather than extrusion. The dry blending operation can be conducted with cooling or with heating. Dry blending with heat is referred to as "bonding". The bonding method is believed to attach the flake pigment to the binder particles, but not to actually disperse the flake pigment in the binder powder particles. The "bonding" method of dispersion is particularly useful in the dispersion of metal flake particles since it eliminates the undesirable electrostatic effects that occur in the electrostatic spraying of metallic particles.

In addition to the colored flake pigments, one or more additional non-flake pigments can be included in the coating composition typically in amounts from 1 to 50 percent by weight, based on the total weight of the powder coating composition. Pigments which are suitable for powder coating compositions may be organic or inorganic and include, for example, basic lead silica chromate, titanium dioxide, ultramarine blue, phthalocyanine blue, phthalocyanine green, carbon black, black iron oxide, chromium green oxide, ferrite yellow and quinto red.

Other additives, such as flow control agents, anti-popping agents, and anti-caking agents, may be added to the powder coating. Suitable as flow control agents are acrylic polymers, such as polylauryl acrylate, polybutyl acrylate, poly(2-ethylhexyl)acrylate, poly(ethyl-2-ethylhexyl)acrylate, polylauryl methacrylate, polyisodecyl methacrylate and the like, and fluorinated polymers such as esters of polyethylene glycol or polypropylene glycol with fluorinated fatty acids, e.g., an ester of polyethylene glycol having a molecular weight over about 2,500 and perfluorooctanoic acid. Polymeric siloxanes with molecular weights over 1,000 may also be used as a flow control agent, for example, polydimethylsiloxane or poly (methylphenyl)siloxane. The flow control agents can further aid in reduction of surface tension during heating of the powder and in eliminating crater formation. Generally, the flow control agent, when used, is present in amounts from about 0.05 to about 5 percent by weight based on the total weight of the powder coating composition.

Additionally, when desired, anti-popping agents can be added to the compositions to allow any volatile material present to escape from the film during baking. Benzoin is a highly preferred degassing agent and when used is present amounts ranging from about 0.5 to about 3 percent by weight based on total weight of the powder coating composition. The powder coating compositions may also contain UV absorbing agents, such as those available under the tradename TINUVIN® from Ciba Specialty Chemicals, which when used are typically present in the compositions in amounts of 0.5 to 6 percent by weight based on the total weight of the powder coating composition.

In addition, the powder coating composition may contain fumed silica or the like as a powder flow additive to reduce caking of the powder during storage. An example of a suitable fumed silica is available from Cabot Corporation under the trademark CAB-O-SIL RTM. The powder flow additive, when used, is generally present in amounts ranging from 0.1 to 0.5 percent by weight based on the total weight of the powder coating composition. The powder flow additive is generally added to the powder coating composition after preparation of the particulate mixture.

The powder coating (either the powder base coat or the powder clear coat) can be applied by electrostatic spraying or by the use of a fluidized bed. Electrostatic spraying is preferred. The powder coating composition can be applied in one pass or in several passes to provide a film thickness after cure of about 12.7 to about 102 micrometers (0.5 to about 4 mils). Preferred coating thickness is such that good chip resistance, U.V. opacity, and visual hiding is realized. Preferred film thickness is 51 to 102 micrometers (2 to 4 mils). The substrate to be coated can optionally be preheated prior to application of the powder to promote a more uniform powder deposition.

After application of the powder base coating to the substrate, the substrate is heated to a temperature sufficient to melt and coalesce the coating. The heating step should be conducted such that the powder coating coalesces to a substantially continuous fluid layer, but not so high as to cause viscosity increase and, where applicable, crosslinking of the coating. The layer is maintained in the fluid state for a period of time sufficient for any flake pigment to rise to the coating-air interface and to align so that the two largest dimensions of the pigment flake are almost parallel with the coating surface. After the pigment has aligned itself with the coating surface, the coating may continue to be heated until, in the case of thermoset powder basecoats, partial or complete cure is accomplished Alternatively, the coating may be cooled prior to cure. In the case where thermoplastic or radiation cured clear topcoat is applied to a thermoset powder color coat, the coated substrate must be heated for a period sufficient to cure the color coat. Typically, the powder base coat is heated to a temperature between 120° C. and 185° C. for a period of 4 minutes to 40 minutes. Alternatively when a heat curable thermosetting clear coat is used, the color coat does not have to be completely cured and complete cure can occur during the cure cycle of the thermosetting clear coat (i.e., where the powder base coat and the powder clear coat are co-cured).

In a particular embodiment of the present invention, the powder base coat is topcoated with a clear coat to enhance the appearance of the color coat and/or to improve the physical properties of the color coats. The clear topcoat may be any known in the art, but preferred topcoats are thermoset types. Particularly preferred topcoats are thermoset powder clear topcoats.

The clear powder topcoat may optionally contain additives for flow and wetting such as waxes, degassing additives such as benzoin, adjuvant resin to modify and optimize coating properties, ultraviolet (UV) light absorbers and curing catalyst. These optional additives, when present, are used in amounts up to 11.0% by weight based on weight of resin solids of the coating composition.

The clear powder topcoat may be applied by electrostatic spray or fluidized bed, but electrostatic spray is preferred. The preferred film thickness is between 38 and 90 micrometers (1.5 and 3.5 mils). The clear powder topcoat is heated to a temperature and for a period of time sufficient to melt and coalesce the powder particles, and in the case of a heat-cured thermoset clear topcoat, to cure the topcoat and any uncured portions of the basecoat and weldable primer. Liquid clearcoats may also be used. The crosslink mechanism of thermoset coatings may be thermal cure or ultraviolet radiation or ionizing radiation cure, although thermal cure is typical. Also thermoplastic clear coats may be used.

The powder coatings compositions typically are prepared by blending the polymers containing the functional groups, crosslinking agents (for thermosetting compositions) and optional ingredients for 15 minutes in a Henschel blade blender. The powder is then usually extruded such as through a Baker-Perkins twin-screw extruder. The extrudate is particulized typically by first chipping into flake and then milling in a hammer mill. The finished powder can be then classified to a particle size of usually between 20 and 30 micrometers in a cyclone grinder/sifter.

We claim:

1. A method of coating a substrate comprising:
   (a) optionally, applying a pretreatment composition to the substrate;
   (b) optionally, applying a conductive, weldable coating composition to the substrate;
   (c) optionally, coalescing the conductive, weldable coating composition to form a substantially continuous conductive coating;
   (d) applying a rinse composition to the substrate, said rinse composition comprising one or more surface energy modifying compounds;
   (e) applying a powder coating composition to the substrate of step (d);
   (f) heating the powder coating composition to a temperature and for a period of time sufficient to melt the powder coating composition to form a substantially continuous powder coating on the substrate, but not to crosslink the powder coating composition;
   (g) optionally, applying a clear coating composition over at least a portion of the powder coating; and
   (h) heating the substrate to a temperature and for a period of time sufficient to coalesce and crosslink the coating composition applied in step (e) and, optionally, step (g).

2. The method of claim 1, wherein the one or more surface energy-modifying compounds present in the rinse composition applied in step (d) are characterized in that a surface energy of the substrate of step (d) is lower than the surface tension of the melted powder coating of step (f).

3. The method of claim 2, wherein the concentration of the one or more surface energy-modifying compounds present in the rinse composition ranges from 150 to 50,000 parts per million.

4. The method of claim 1, wherein the substrate comprises a metallic substrate.

5. The substrate of claim 4, wherein the substrate comprises a ferrous substrate.

6. The method of claim 1, wherein the substrate is non-metallic.

7. The method of claim 1, wherein the substrate comprises a non-ferrous substrate.

8. The substrate of claim 5, wherein the substrate comprises a ferrous substrate selected from at least one of electrogalvanized steel, hot dip galvanized steel, stainless steel, zinc-iron alloys, zinc aluminum alloys, cold rolled steel, combinations and mixtures thereof.

9. The method of claim 8, wherein the metallic substrate comprises a zinc-iron alloy.

10. The method of claim 1, wherein the optional clear coating composition of step (g) is a powder coating composition.

11. The method of claim 1, wherein the rinse composition comprises a surface modifying compound selected from nonionic surfactants, amphoteric surfactants and mixtures thereof.

12. The method of claim 1, wherein the powder coating composition of step (e) and the optional clear coating composition of step (g) are both thermosetting compositions.

13. The method of claim 1, wherein the powder coating composition of step (e) comprises as a binder a polymer comprising carboxylic acid functional groups, and a hydroxyalkylamide curing agent.

14. The method of claim 12, wherein the polymer comprising carboxylic acid functional groups is a polyester polymer.

15. The method of claim 12, wherein the powder coating composition of step (e) comprises as a binder a polymer comprising epoxy functional groups, and a polyacid curing agent.

16. The method of claim 15, wherein the polymer comprising epoxy functional groups is an acrylic polymer.

17. A method of coating a substrate comprising:
(a) optionally, applying a pretreatment composition to at least a portion of the substrate;
(b) applying a rinse composition to the substrate, said rinse composition comprising one or more surface energy-modifying compounds;
(c) applying a powder coating composition to the substrate of step (b); and
(d) heating the substrate to a temperature and for a time sufficient to melt and coalesce the powder coating composition to form a substantially continuous powder coating on the substrate, but not to crosslink the powder coating composition; and
(e) heating the substrate for a period of time sufficient to coalesce and crosslink the powder coating composition of step (d).

18. The method of claim 17, wherein the one or more surface energy-modifying compounds are characterized such that a surface energy of the substrate of step (b) is lower than the surface tension of the melted powder composition of step (d).

19. The method of claim 17, wherein the concentration of the one or more surface modifying compounds present in the rinse composition ranges from 150 to 50,000 parts per million.

20. The method of claim 17, wherein the one or more surface modifying compounds is selected from nonionic surfactants, amphoteric surfactants, and mixtures thereof.

21. The method of claim 17, wherein the substrate comprises a metallic substrate.

22. The method of claim 17, wherein the substrate comprises a non-metallic substrate.

23. The method of claim 17, further comprising the following steps:
(f) applying a clear coating composition over at least a portion of the powder coating formed in step (e); and
(g) heating the substrate of step (f) to a temperature and for a time sufficient to coalesce and crosslink the clear coating.

24. The method of claim 23, wherein both the powder coating composition and the clear coating composition are thermosetting compositions.

25. The method of claim 23, wherein the clear coating composition is a powder coating composition.

26. The method of claim 24, wherein the powder coating composition comprises as a binder a polymer comprising carboxylic acid functional groups, and a hydroxyalkylamide curing agent.

27. The method of claim 26, wherein the polymer comprising carboxylic acid functional groups is a polyester polymer.

28. The method of claim 24, wherein the powder coating composition comprises as a binder a polymer comprising epoxy functional groups, and a polyacid curing agent.

29. The method of claim 28, wherein the polymer comprising epoxy functional groups is an acrylic polymer.

30. The method of claim 21, wherein the metallic substrate comprises a ferrous substrate selected from at least one of electrogalvanized steel, hot dip galvanized steel, stainless steel, zinc-iron alloys, zinc aluminum alloys, cold rolled steel, combinations and mixtures thereof.

31. The method of claim 30, wherein the ferrous substrate comprises a zinc-iron alloy.

32. A substrate coated by the method of claim 1.

33. A substrate coated by the method of claim 17.

* * * * *